United States Patent Office 3,681,316
Patented Aug. 1, 1972

3,681,316
t-BUTYL CARBOCYCLIC SUBSTITUTED CUMENE PEROXIDES AS CURING AGENTS
Frederick G. Schappell, Newark, Del., assignor to Hercules Incorporated, Wilmington, Del.
No Drawing. Original application Aug. 7, 1968, Ser. No. 750,745, now Patent No. 3,584,057. Divided and this application Feb. 22, 1971, Ser. No. 117,687
Int. Cl. C08d 5/02, 5/04; C08f 27/00
U.S. Cl. 260—94.9 GA
16 Claims

ABSTRACT OF THE DISCLOSURE

Peroxides of the formula

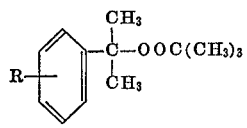

where R has the formula

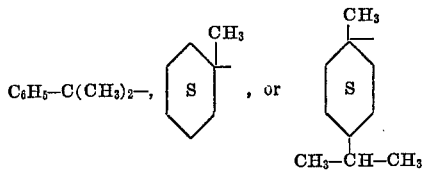

are peroxides which cure polyethylene and other polymers and have odor-free, non-blooming and non-scorching properties.

---

This application is a division of application Ser. No. 750,745, filed Aug. 7, 1968.

This invention relates to organic peroxides and to crosslinkable compositions containing the same.

Dicumyl peroxide, α-t-butyl cumyl peroxide and bis-(t-butylperoxyisopropyl)benzene are well known crosslinking agents for polymers. Only the latter of this group gives an odor-free cure but it has a disadvantage of bloom. Nevertheless it has the added advantage of being non-scorching. Peroxides which give odor-free cure and are non-blooming and non-scorching are particularly desirable.

It has now been found that α-t-butylperoxyisopropylbenzene substituted in the benzene ring with an R group of the formula

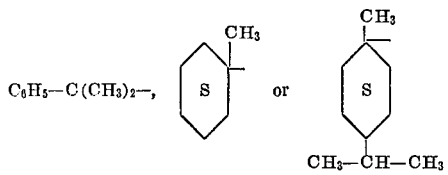

have the odor-free curing property of the bisperoxides and are non-blooming and non-scorching.

The peroxides of this invention have the formula

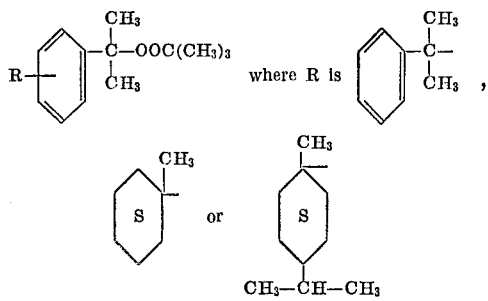

The preparation and use of the peroxides of this invention are illustrated by the following examples in which all parts and percentages are by weight.

EXAMPLE 1 p-Isopropyl-α-chloroisopropylbenzene was prepared by mixing 40 parts each of p-isopropenylisopropylbenzene and cumene and adding the mixture dropwise to 100 parts cumene saturated with dry hydrogen chloride at 0° C.; and after about an hour this mixture was added dropwise to a mixture of 1500 parts cumene, 8 parts aluminum chloride, and 10 parts nitromethane, and are maintained saturated with dry hydrogen chloride at 0° C. for one hour. The reaction was terminated by adding water, separating the acidic water and washing with 8% sodium hydroxide. The product was distilled to obtain 42.2 parts of α-phenyl-p-diisopropylbenzene B.p. 120–130° C./0.95–0.85 torr and the structure was verified by molecular weight and NMR analyses. Benzene and diisopropylbenzene were by-products of the reaction.

α-Phenyl-α'-hydroxy-p-diisopropylbenzene was prepared by contacting 40.4 parts of α-phenyl-p-diisopropylbenzene with oxygen at 115° C. while vigorously mixing with 50% sodium hydroxide for 8 hours. It was purified by countercurrent distribution between methanol and hexane.

α - t Butylperoxy-α'-phenyl-p-diisopropylbenzene was prepared by mixing 12.7 parts α-phenyl-α'-hydroxy-p-diisopropylbenzene, 6.6 parts 82% t-butylhydroperoxide and 100 parts hexane refluxing to azeotropically remove water and then adding 0.25 part p-toluene sulfonic acid and continuing to reflux until no more water evolved. The product amounting to 12.7 parts was 52.5% α-t-butylperoxy-α'-phenyl-p-diisopropylbenzene as shown by iodometric peroxide analysis.

EXAMPLE 2

4-(1-methylcyclohexyl)isopropylbenzene was prepared by reacting 120 parts cumene with 96 parts 1-methylcyclohexene in the presence of 166 parts 96% sulfuric acid for 1.25 hours at 5–10° C. The reaction mixture was washed with water and aqueous sodium hydroxide and then distilled. The fraction boiling at 124–129° C. (3.4–3.9 torr), amounting to 133 parts was the desired product.

4 - (1 - methylcyclohexyl)-α-hydroxyisopropylbenzene was prepared by oxidizing 4 - (1 - methylcyclohexyl)isopropylbenzene as in Example 1.

4 - (1 - methylcyclohexyl)-α-t-butylperoxyisopropylbenzene was prepared by reacting 69.6 parts 4-(1-methylcyclohexyl)-α-hydroxyisopropylbenzene with 32.4 parts 82% t-butylhydroperoxide in 90 parts heptane using 0.57 part p-toluenesulfonic acid in 2 ml. water as the catalyst. The reaction was carried out as in Example 1 using azeotropic distillation for removal of water. The desired peroxy compound obtained amounted to 82.4 parts and was 57.4% pure as determined by iodometric analysis for peroxide content.

EXAMPLE 3

4 - (1 - methyl-4-isopropylcyclohexyl)isopropylbenzene was prepared by reacting 120 parts cumene with 97.4 parts carvomenthene in the presence of 156 parts 96% sulfuric acid for 1.25 hours at 5–10° C. as in Example 1. There was obtained 112.6 parts of distilled product of which 62.4% was the above named isomer and 37.6% was the isomers thereof.

4 - (1-methyl - 4 - isopropylcyclohexyl)α-hydroxyisopropylbenzene was prepared by contacting 100 parts of 4-(1-methyl - 4 - isopropylcyclohexyl)isopropylbenzene in admixture with its isomers with 50 parts 50% sodium hydroxide and oxygen while agitating vigorously for about 12 hours at 110–117° C. The 4-(1-methyl-4-isopropylcyclohexyl)α - hydroxyisopropylbenzene was separated by countercurrent distribution between hexane and acetonitrile from the hydrocarbon fraction as a crystalline mixture of isomers which was not further purified.

4-(1-methyl - 4 - isopropylcyclohexyl)-(α-t-butylperoxyisopropyl)benzene was prepared by reacting 19.17 parts 4-(1-methyl - 4 - isopropylcyclohexyl)-(α-hydroxyisopropyl)benzene, with 25 parts t-butylhydroperoxide in 80 parts heptane containing 0.25 part p-toluenesulfonic acid catalyst by the method used in Example 1. The product amounting to 20.6 parts was a crystalline mixture of isomers which was shown by iodometric analysis for peroxides to be 80.1% peroxides of the designated formula.

CURING EXAMPLES

Samples of unfilled and black-filled (40 phr.) polyethylene (low density) were prepared and compounded with 1.0 and 2.0 phr. of the peroxides of this invention, and 0.5 phr. antioxidant (AgeRite Resin D, R. T. Vanderbilt Co. trademark for polymerized trimethyldihydroquinoline) on a two-roll mill at 113–118° C. The black-filled compositions contained 40 phr. carbon black. After compounding and sheeting off the mill, samples were placed in a 2.54 x 1.27 x 0.1891 cm. picture frame mold and cured at 177° C. for 10 minutes, and another sample was cured at 188° C. for 10 minutes. The gel-swell values for each composition were determined by immersing the sample in xylene at 110° C. for 16 hours, and then determining the gel and swell. The data are tabulated in Tables 1 and 2. The peroxides used are:

Percent pure by peroxide analysis
(A) Example 1 _____ 52.5
(B) Example 2 _____ 57.4
(C) Example 3 _____ 80.1
(D) Bis(α-t-butylperoxyisopropyl)benzene _____ 92.0
(E) Dicumyl peroxide _____ 90.0

TABLE 1.—UNFILLED COMPOSITIONS

| Sample | Peroxide | | | Gel (swell) results, percent | |
|---|---|---|---|---|---|
| | Equivalent weight | Weight (phr.) | | Milli-equiv. (phr.) | 177° C. cure [1] | 188° C. cure [1] |
| | | Gross | Corrected | | | |
| A | 326 | 1 | 0.525 | 1.61 | 78 (2910) | 73 (2990) |
| A | 326 | 2 | 1.050 | 3.22 | 79 (1750) | 79 (1590) |
| B | 304 | 1 | 0.574 | 1.90 | 76 (3000) | 75 (3080) |
| B | 304 | 2 | 1.148 | 3.80 | 75 (2940) | 76 (2530) |
| C | 346 | 1 | 0.801 | 2.32 | 74 (3300) | 79 (1310) |
| C | 346 | 2 | 1.602 | 4.64 | 80 (2270) | 76 (1470) |
| D | 164 | 1 | 0.920 | 5.61 | 80 (1420) | 80 (1490) |
| D | 164 | 2 | 1.84 | 11.22 | 86 (700) | 87 (760) |
| E | 270 | 2 | 1.80 | 6.75 | [2] 85 (850) | |

[1] 10 minute cure.   [2] 7 minute cure.

TABLE 2.—CARBON BLACK-FILLED

| Sample | Peroxide | | | Gel (swell) results, percent | |
|---|---|---|---|---|---|
| | Equivalent weight | Weight (phr.) | | Milli-equiv. (phr.) | 177° C. cure [1] | 188° C. cure [1] |
| | | Gross | Corrected | | | |
| A | 326 | 1 | 0.525 | 1.61 | 59 (2970) | 78 (2370) |
| A | 326 | 2 | 1.050 | 3.22 | 81 (1170) | 85 (1080) |
| B | 304 | 1 | 0.574 | 1.90 | 70 (2210) | 76 (1800) |
| B | 304 | 2 | 1.148 | 3.80 | 74 (1400) | 82 (1060) |
| C | 346 | 1 | 0.801 | 2.32 | 65 (2410) | 68 (2240) |
| C | 346 | 2 | 1.602 | 4.64 | 67 (2240) | 73 (1390) |
| D | 164 | 1 | 0.920 | 5.61 | 78 (1020) | 81 (990) |
| D | 164 | 2 | 1.840 | 11.22 | 71 (725) | 82 (1300) |
| E [3] | 270 | 1.5 | 1.35 | 5.0 | [2] 80 (700) | |

[1] 10 minute cure.   [2] 7 minute cure.   [3] 80 phr. carbon black.

EPM compositions were prepared by milling 100 parts ethylene-propylene copolymer (40–46% ethylene-54–60% propylene (70 parts carbon black, 5 parts zinc oxide and 0.5 part AgeRite Resin D antioxidant, and then incorporating 5 parts of peroxide to act as a curing agent. The peroxides used were:

Percent pure by peroxide analysis
(F) Example 1 _____ 52.5
(G) Example 2 _____ 57.4
(H) m-Bis(α-t-butylperoxyisopropyl)benzene _____ 100

The compositions were tested on the Monsanto oscillating disk rheometer. This rheometer is a device which measures dynamic properties, curing and processing characteristics of elastomer compositions during the curing cycle. In the test a sample is placed in the device and a disk embedded in the sample was subjected to oscillatory motion by a motor-driven eccentric wherein the force (torque) required to oscillate the disk could be measured electronically while heating at controlled temperatures. The tests were carried out at 330° F. with oscillation at 900 cycles per minute while following the torque measurements. The first torque measurement taken was the minimum reached at initial equilibrium before cure began, T-min. Subsequent torque measurements were taken at intervals of time so as to be able to plot a curve of torque against time. The test was stopped after a maximum was reached. Pertinent data are reported in Table 3.

TABLE 3.—EPM CURE DATA (165.5° C.)

| Sample | Peroxide | Torque, min. | Time [1] | Scorch time [1] | $T_{90}$ | $t_{90}$ [1] | $T_{95}$ | $t_{95}$ [1] | Torque, max. | ½ life [1] | Cure Rate [1] |
|---|---|---|---|---|---|---|---|---|---|---|---|
| F | Example I | 30.4 | 2.1 | 3.2 | 48.1 | 18.4 | 49 | 22.1 | 50 | 4.5 | 15.2 |
| G | Example II | 30.6 | 1.9 | 3.2 | 43.9 | 15.7 | 44.7 | 18.8 | 45.4 | 4.3 | 12.5 |
| H | S890 100% M | 33.7 | 1.8 | 2.8 | 45.3 | 17 | $T_{95}$ | 20.7 | 46.6 | 5.0 | 14.2 |

[1] Time in minutes.

Besides polyethylene, the following polymers are curved by the peroxides of this invention when compounded by the above procedure, or by known processes particularly adapted to the particular polymer: natural rubber polyisoprene, cis-4-polybutadiene, poly(chloroprene), polystyrene, silicon rubber, EPM, EPDM, SBR, NBR and mixtures of said polymers.

The amount of composition used in compounding with the polymer is usually in the range of from about 0.1% to about 5% phr., in an amount sufficient for the desired degree of crosslinking. The compounding can be carried out in any of the well-known milling or mixing devices known to the art, or the peroxide can be coated on the surface of the compounded rubber using a solvent solution of the peroxide. The polymer can be thus compounded in thin sheets with the peroxide added last. The polymer can be filled with the usual rubber fillers, or it can be unfilled.

The curing process is accomplished by heating at a temperature in the range of 130° C. to 200° C. for a time sufficient to effect the desired cure. During cure, the polymer composition can be held in a shaping mold, or it can be pre-shaped and cured outside a mold.

What I claim and desire to protect by Letters Patent is:
1. A composition capable of being crosslinked by heating comprising a polymer of the group consisting of polyethylene, natural rubber, polystyrene, polyisobutylene, cis-4-polybutadiene, poly(chloroprene), silicone rubber, EPM, EPDM and NBR and a crosslinking amount of a peroxide of the formula

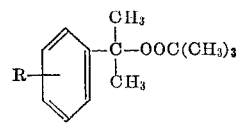

where R is

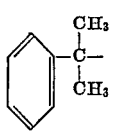 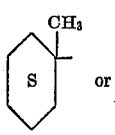 or 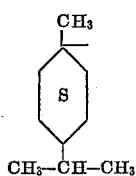

2. The composition of claim 1 wherein the peroxide is a peroxide of the formula

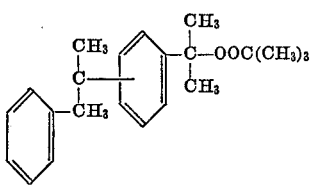

3. The composition of claim 1 wherein the peroxide is a peroxide of the formula

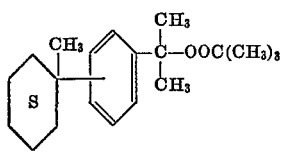

4. The composition of claim 1 wherein the peroxide is a peroxide of the formula

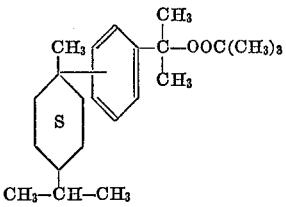

5. The composition of claim 1 wherein the polymer is polyethylene.
6. The composition of claim 2 wherein the polymer is polyethylene.
7. The composition of claim 3 wherein the polymer is polyethylene.
8. The composition of claim 4 wherein the polymer is polyethylene.
9. The heat-cured composition of claim 1.
10. The heat-cured composition of claim 2.
11. The heat-cured composition of claim 3.
12. The heat-cured composition of claim 4.
13. The heat-cured composition of claim 5.
14. The heat-cured composition of claim 6.
15. The heat-cured composition of claim 7.
16. The heat-cured composition of claim 8.

References Cited

UNITED STATES PATENTS 3,584,057   6/1971   Schappell _____ 260—610

JOSEPH L. SCHOFER, Primary Examiner

W. F. HAMROCK, Assistant Examiner

U.S. Cl. X.R.

260—46.5 G, 80.78, 92.3, 94.7, 94.8, 768